(12) United States Patent
Beck

(10) Patent No.: US 10,326,354 B2
(45) Date of Patent: Jun. 18, 2019

(54) METHOD AND SYSTEM FOR DC-DC VOLTAGE CONVERTERS WITH DIMINISHED PWM JITTER

(71) Applicant: Intersil Americas LLC, Milpitas, CA (US)

(72) Inventor: David L. Beck, Austin, TX (US)

(73) Assignee: Intersil Americas LLC, Milpitas, CA (US)

( * ) Notice: Subject to any disclaimer, the term of this patent is extended or adjusted under 35 U.S.C. 154(b) by 0 days.

(21) Appl. No.: 15/725,695

(22) Filed: Oct. 5, 2017

(65) Prior Publication Data

US 2018/0032096 A1 Feb. 1, 2018

Related U.S. Application Data

(63) Continuation of application No. 15/133,508, filed on Apr. 20, 2016, now Pat. No. 9,785,166.

(60) Provisional application No. 62/266,784, filed on Dec. 14, 2015.

(51) Int. Cl.
| | |
|---|---|
| *H02M 1/14* | (2006.01) |
| *H02M 1/15* | (2006.01) |
| *H02M 3/158* | (2006.01) |
| *H02M 3/157* | (2006.01) |
| *H02M 1/00* | (2006.01) |

(52) U.S. Cl.
CPC .............. *H02M 1/15* (2013.01); *H02M 1/14* (2013.01); *H02M 3/158* (2013.01); *H02M 3/157* (2013.01); *H02M 2001/0025* (2013.01)

(58) Field of Classification Search
CPC ......... H02M 2003/1566; H02M 3/157; H02M 3/1584; H02M 2003/1586; H02M 2001/0025; H02M 1/14; H02M 1/143
USPC ................................ 323/272, 282, 283, 284
See application file for complete search history.

(56) References Cited

U.S. PATENT DOCUMENTS

| | | | |
|---|---|---|---|
| 5,312,445 A | 5/1994 | Nappholz et al. | |
| 5,619,405 A | 4/1997 | Kammiller et al. | |
| 5,740,023 A | 4/1998 | Brooke et al. | |
| 6,278,263 B1 | 8/2001 | Walters et al. | |
| 6,359,416 B1 * | 3/2002 | Rao .......................... | H02P 21/22 318/609 |
| 6,518,738 B1 | 2/2003 | Wang | |

(Continued)

OTHER PUBLICATIONS

Mohammad Ali Bagherzadeh et al., "Variable Gain Adaptive Controller Based on Sensitivity Method for DC-DC Boost Converter", The 22nd Iranian Conference on Electrical Engineering (ICEE 2014) May 20-22, 2014, pp. 787-792.

(Continued)

*Primary Examiner* — Fred E Finch, III
(74) *Attorney, Agent, or Firm* — Foley & Lardner LLP

(57) ABSTRACT

An embodiment pertains to a method including determining if an amplitude of an error signal has entered steady state. If the amplitude of the error signal has not entered steady state, then amplify with a high gain the amplitude of the AC component of the error signal. If the amplitude of the error signal has entered steady state, then initiate a timer. Determining if the amplitude of the error signal has remained in steady state while the timer runs. If the amplitude of the error signal has remained in steady state while the timer runs, then amplify with a low gain the amplitude of the AC component of the error signal.

20 Claims, 8 Drawing Sheets

(56) References Cited

U.S. PATENT DOCUMENTS

| | | |
|---|---|---|
| 6,642,631 B1 | 11/2003 | Clavette |
| 6,791,306 B2 | 9/2004 | Walters et al. |
| 7,602,155 B2 | 10/2009 | Markowski |
| 7,919,952 B1 | 4/2011 | Fahrenbruch |
| RE43,414 E | 5/2012 | Walters et al. |
| 8,239,597 B2 | 8/2012 | Wishneusky |
| 8,274,265 B1 | 9/2012 | Khanna et al. |
| 8,575,910 B2 | 11/2013 | Young |
| 9,077,244 B2 | 7/2015 | Wu et al. |
| 9,785,166 B2 * | 10/2017 | Beck .............. G05F 1/575 |
| 2002/0048069 A1 | 4/2002 | Ibukuro |
| 2003/0161167 A1 | 8/2003 | Barnett et al. |
| 2006/0017424 A1 | 1/2006 | Wood et al. |
| 2006/0072253 A1 | 4/2006 | Rozen et al. |
| 2006/0239046 A1 | 10/2006 | Zane et al. |
| 2008/0054869 A1 | 3/2008 | Chang |
| 2008/0309300 A1 | 12/2008 | Liu et al. |
| 2010/0072964 A1 * | 3/2010 | Qiu .............. H02M 3/156 323/282 |
| 2010/0085024 A1 | 4/2010 | Houston et al. |
| 2010/0181975 A1 | 7/2010 | Piselli et al. |
| 2010/0244799 A1 | 9/2010 | Moussaoui |
| 2011/0199065 A1 | 8/2011 | Kume |
| 2011/0260703 A1 * | 10/2011 | Laur .............. H02M 3/1563 323/271 |
| 2012/0139513 A1 * | 6/2012 | Sreenivas .............. H02M 3/156 323/272 |
| 2014/0253075 A1 | 9/2014 | Tuten |
| 2014/0266122 A1 * | 9/2014 | Zhu .............. H02M 3/156 323/284 |
| 2016/0087595 A1 | 3/2016 | Gopalraju et al. |
| 2016/0274651 A1 | 9/2016 | Laur |
| 2017/0060154 A1 | 3/2017 | Ozawa |
| 2017/0141684 A1 | 5/2017 | Beck |
| 2017/0163155 A1 | 6/2017 | Chieng |
| 2017/0207723 A1 * | 7/2017 | Zhang .............. H02M 7/537 |
| 2018/0032096 A1 * | 2/2018 | Beck .............. G05F 1/575 |
| 2018/0050603 A1 * | 2/2018 | Hand, III .............. B60L 11/1862 |

OTHER PUBLICATIONS

Sang Woo Kang et al., "Gain-Scheduled Control Using Voltage Controlled Oscillator with Variable Gain for a LLC Resonant Converter", IEEE 2014, pp. 4466-4471.

Stefano Saggini et al., "A Simple Digital Autotuning for Analog Controller in SMPS", IEEE Transactions on Power Electronics, vol. 25, No. 8, Aug. 2010, pp. 2170-2178.

Zdravko Lukie et al., "Multibit Σ-Δ, PWM Digital Controller IC for DC-DC Converters Operating at Switching Frequencies Beyond 10MHz", IEEE Transactions on Power Electronics, vol. 22, No. 5, Sep. 2007, pp. 1693-1707.

* cited by examiner

US 10,326,354 B2

METHOD AND SYSTEM FOR DC-DC VOLTAGE CONVERTERS WITH DIMINISHED PWM JITTER

CROSS-REFERENCE TO RELATED APPLICATIONS

The present application is a continuation of U.S. application Ser. No. 15/133,508 filed Apr. 20, 2016, now U.S. Pat. No. 9,785,166, which application claims priority to U.S. Provisional Patent Application No. 62/266,784 filed Dec. 14, 2015, the contents of all such applications being incorporated herein by reference in their entirety.

It should be noted that some details of the Figures have been simplified and are drawn to facilitate understanding of the inventive embodiments rather than to maintain strict structural accuracy, detail, and scale. It should also be noted that not all circuit elements and operating steps are illustrated, as the general methods of circuit design and operation are well known. It should also be noted that not all details about voltage converters are illustrated, as general designs of voltage converters are well known.

Reference will now be made in detail to the present embodiments (exemplary embodiments) of the present teachings, examples of which are illustrated in the accompanying drawings. Wherever possible, the same reference numbers will be used throughout the drawings to refer to the same or like parts.

DETAILED DESCRIPTION

Embodiments relate generally DC-DC voltage converters with diminished PWM signal jitter.

Figure 1:
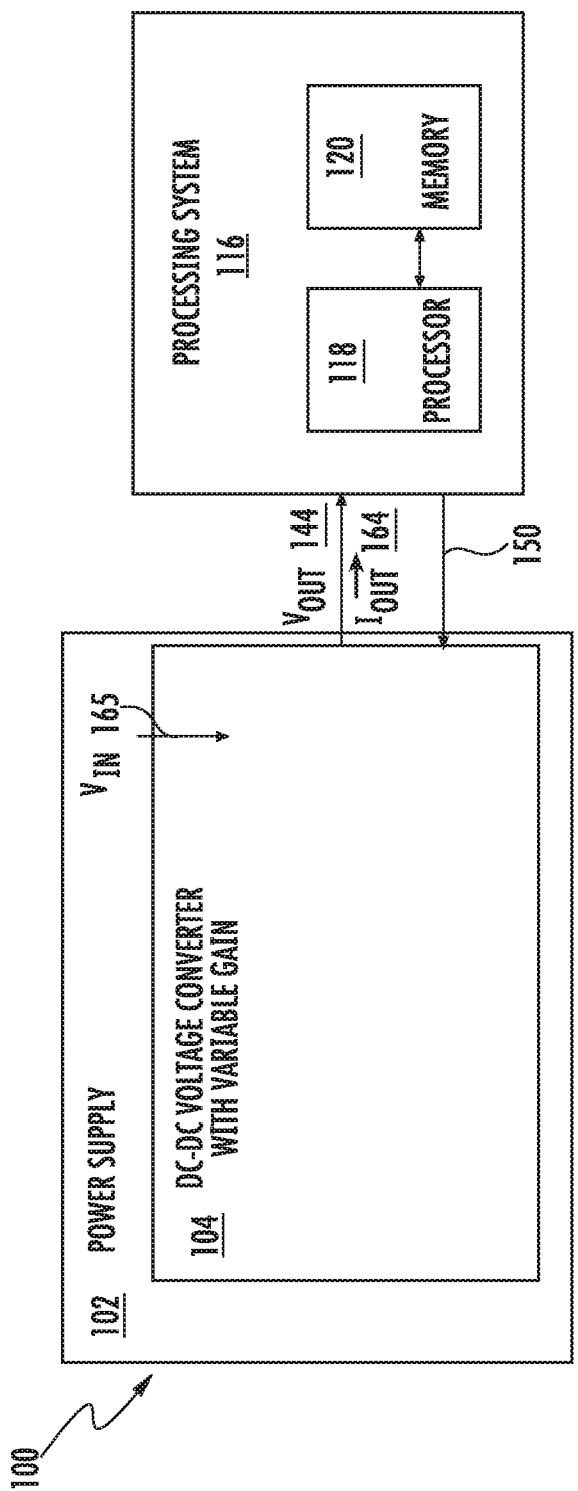
FIG. 1 illustrates an embodiment of an electrical system.

FIG. 1 illustrates an exemplary electrical system 100 comprising a load, e.g. a processing system 116, and power supply 102. The power supply 102 advantageously includes a voltage converter, e.g. a DC-DC voltage converter with variable gain 104. The processor 118 can be electrically coupled to, communicate with, and/or control the voltage converter through a data bus 150. This electrical system 100 may be a device related to telecommunications, automobiles, semiconductor test and manufacturing equipment, consumer electronics, or any type of electronic equipment.

The power supply 102 may be AC to DC power supply, or a DC supply powered by a battery. The power supply 102 provides a DC-DC voltage converter with variable gain 104 with an input voltage 165, VIN, to power the DC-DC voltage converter with variable gain 104. The DC-DC voltage converter with variable gain 104 has an output voltage 144, VOUT, and an output current 164, IOUT.

In one embodiment, the processing system 116 may include a processor 118 and memory 120 which are coupled to one another. In another embodiment, the processor 118 may be one or more microprocessors, microcontrollers, embedded processors, digital signal processors, or a combination of two or more of the foregoing. The memory 120 may be one or more volatile memories and/or non-volatile memories such as static random access memory, dynamic random access memory, read only memory, flash memory, or a combination of two or more of the foregoing. The DC-DC voltage converter with variable gain 104 provides a voltage to the load, processing system 116, which is more precise and efficient than a voltage provided by other voltage sources such as low drop out regulators.

The DC-DC voltage converter with variable gain 104, illustrated in FIG. 1, can be implemented in a current mode or a voltage mode DC-DC voltage converter. Voltage mode DC-DC voltage converters are often used to avoid having to implement circuitry to measure instantaneous current levels. The DC-DC voltage converter subsequently illustrated is a voltage mode DC-DC voltage converter. However, the present invention may be used in a current mode DC-DC voltage converters can be alternatively used.

A multiphase DC-DC voltage converter, a digital DC-DC voltage converter, and the combination thereof may each be implemented with the techniques illustrated for the DC-DC voltage converter with variable gain 104. Multiphase DC-DC voltage converters are used to provide higher and more accurate output current capacity. Digital DC-DC voltage converters are used to provide higher efficiency and operating flexibility.

Figure 2A:
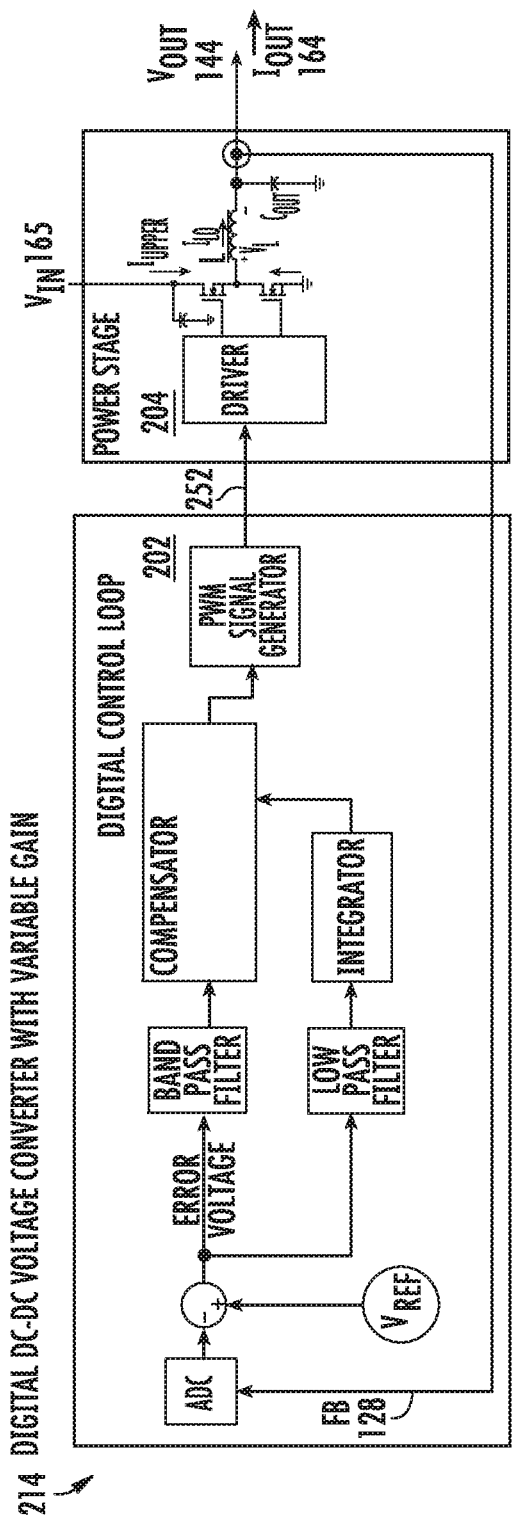
FIG. 2a illustrates an embodiment of a digital DC-DC converter with variable gain.

One embodiment of a digital DC-DC voltage converter with variable gain 214 is illustrated in FIG. 2a. However, the present invention can be implemented in an analog DC-DC voltage converter. The following is a summary description of the exemplary embodiment. More implementation and operation details will be later described.

The illustrated digital DC-DC voltage converter with variable gain 214 has a single phase. However, the present invention can be implemented in a multiphase DC-DC voltage converter. The digital DC-DC voltage converter with variable gain 214 includes a digital control loop with variable gain 202, and a power stage 204.

Each power stage 204 is provided with VIN 165. Each power stage 204 provides an output voltage sense signal 128, FB, e.g., a voltage signal representative of the voltage at the output of the corresponding phase.

An input of the power stage 204 is configured to receive a PWM signal 252 with diminished jitter from the output of the digital control loop with variable gain 202. As will be described subsequently, the PWM signal 252 alternatively turns on and off upper and lower power transistors in the power stage 204.

Externally induced or internally induced noise, e.g. analog to digital converter quantization noise, in a DC-DC voltage converter is undesirable. For example quantization noise can cause jitter in the PWM signal 252. Such jitter can cause undesirable voltage ripple and noise, and diminish DC-DC voltage converter efficiency.

To diminish such noise, the digital DC-DC voltage converter with variable gain 214 of FIG. 2a is advantageously formed with a compensator having an error voltage AC path gain that is dependent upon the amplitude of the error voltage. Embodiments of such a digital DC-DC voltage converter with variable gain 214 are further illustrated in FIG. 2b through FIG. 4.

Figure 2B:
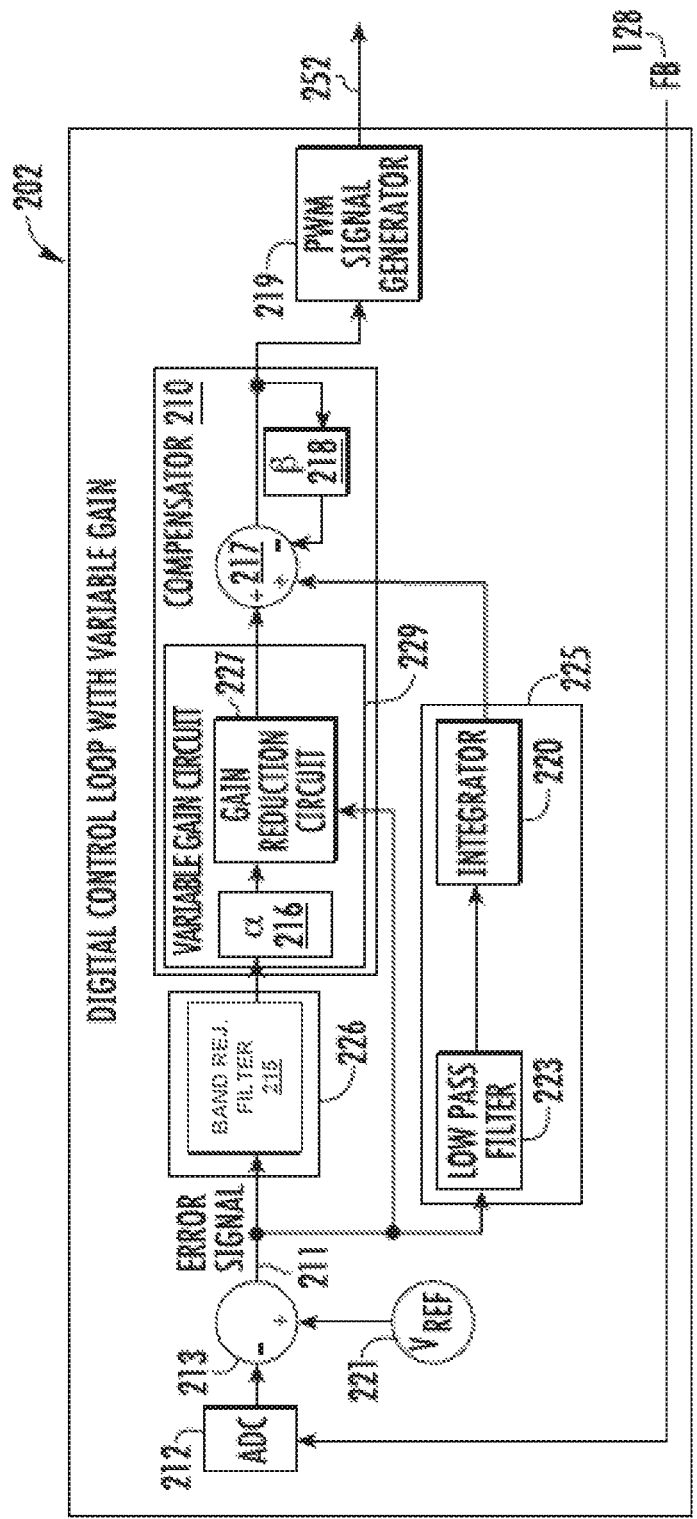
FIG. 2b illustrates an embodiment of a digital control loop with variable gain.

FIG. 2b illustrates an exemplary digital control loop with variable gain 202 that facilitates diminished PWM jitter, and may be used to control one or more phases. The digital control loop with variable gain 202 is configured to receive an output voltage sense signal 128. The digital control loop with variable gain 202 includes an output voltage analog to digital data converter 212 that converts the output voltage sense signal 128 to a digitized output voltage signal. An error amplifier 213, e.g. a digital subtractor, subtracts the digitized output voltage signal from an output voltage from a reference voltage 221. The error amplifier 213 generates an error signal 211, e.g. a voltage. The voltage level of the error signal 211 is the difference between the reference voltage 221 and the digitized output voltage. The previously described feedback loop (formed in part by the output voltage sense signal 128) is intended to drive the output voltage 144 to the desired output voltage, the reference voltage 221 specified by the designer or user of the power supply 102.

The remainder of the digital control loop with variable gain 202 will now be described. A DC path 225 and an AC path 226 are configured to receive the error signal 211. The DC path 225 generates a signal representative of the DC component of the error signal 211. A compensator 210 is configured to receive the output of the DC path 225. In one embodiment, the DC path 225 is implemented by a low pass filter 223 having an output coupled to an integrator 220. For this embodiment, the input of the low pass filter 223 is configured to receive the error signal 211. The compensator 210 is configured to receive an output of the integrator 220.

The AC path 226 generates a signal representative of the AC component of the error signal 211. In one embodiment, the AC path 226 includes a band reject filter 215, e.g. a notch or comb filter, which is configured to receive the error signal 211. In one embodiment, the band reject filter 215 is a ripple filter. The compensator 210 is configured to receive an output of the band reject filter 215, e.g. the ripple filter. The AC path 226 removes the peak-to-peak signal component and harmonics of the switching frequency.

A compensator 210, e.g. a single cycle response digital compensator, is configured to receive the output of the band reject filter 215 and the integrator 220. A single cycle response digital compensator for use in digital power management systems is further described in U.S. Pat. No. 8,575,910, which is hereby incorporated by reference. Exemplary compensators will be subsequently described.

The illustrated compensator 210 includes a gain reduction circuit 227, which is configured to receive the output of the band reject filter 215, e.g. ripple filter. The variable gain circuit 229 varies the amplitude of the portion of the error signal 211 (AC component of the error signal) in the AC path 226 based upon the characteristics of amplitude of that AC component of the error signal as further described below. The amplitude of that signal is amplified more (or not attenuated) when the amplitude has reached steady state (as further described below). This improves the signal to noise ratio of the compensator 210 without sacrificing stability.

In one embodiment, the variable gain circuit 229 includes an alpha gain circuit 216 and a gain reduction circuit 227. The alpha gain circuit 216 provides amplification of the AC component of the error signal 211. In another embodiment, the alpha gain circuit 216 is configured to receive the output of the band reject filter 215, e.g. ripple filter, and amplify the amplitude of the corresponding signal by a gain of alpha.

The gain reduction circuit 227 is configured to receive the output of the alpha gain circuit 216 and the error signal 211. In yet another embodiment, the position of the alpha gain circuit 216 and variable gain circuit 229 may be reversed. As further discussed below, in one embodiment, the gain reduction circuit 227 attenuates the output of the alpha gain circuit 216 when the error signal 211 exhibits certain characteristics. Alpha is a gain level.

The compensator 210 also includes a beta gain circuit 218 which is configured to receive the output of a digital summer 217, and multiply that signal by a gain of beta. The beta gain circuit 218 is a feedback element that is used to provide a scaled, e.g. attenuated, value of the output of the compensator 210 to the digital summer 217 where it is subtracted from the summation of the other inputs to the digital summer 217. The scaling factor of the beta gain circuit 218 establishes the zero and pole locations of the compensator 210

When fed back to the digital summer 217, the feedback loop formed by the beta gain circuit 218 improves the compensator's stability, and facilitates the output of the compensator 210 to reach steady state more quickly. The digital summer 217 is configured to receive the output of the alpha gain circuit 216, the output of the beta gain circuit 218, and the output of the integrator 220. The output of the digital summer 217 is the summation of the output of the alpha gain circuit 216, the negative value of the output of the beta gain circuit 218, and the output of the DC path 225, e.g. the output of the integrator 220. This is a function performed by the digital summer 217; thus a summer may be capable of mathematical manipulations, such as subtraction, in addition to summation. This function may be implemented in numerous ways. The output of the beta gain circuit 218 may be subtracted from the summation of the outputs of the alpha gain circuit 216 and the DC path 225. Alternatively, the output of the alpha gain circuit 216 can be added to the difference of the outputs of the DC path 225 and the beta gain circuit 218. In another embodiment, the output of the DC path 225 can be added to the difference of the outputs of the alpha gain circuit 216 and the beta gain circuit 218.

In one embodiment, alpha and beta may be defined by the designer or user of the power supply 102. In another embodiment, the gain of alpha gain circuit 216 may range from 50 to 200, and the gain of beta gain circuit 218 may range from 0 to 1. In yet another embodiment, the gain of beta gain circuit 218 is 0.7. A PWM signal generator 219 is configured to receive the output of the compensator 210, which is the output of the digital summer 217. In one embodiment, the PWM signal generator 219 multiplies, e.g. digitally, the output of the compensator 210 with a saw tooth waveform. The output of the PWM signal generator 219 is configured to provide a PWM signal 252. The PWM signal 252 has pulses of varying widths depending upon the output of the compensator 210.

Figure 2C:
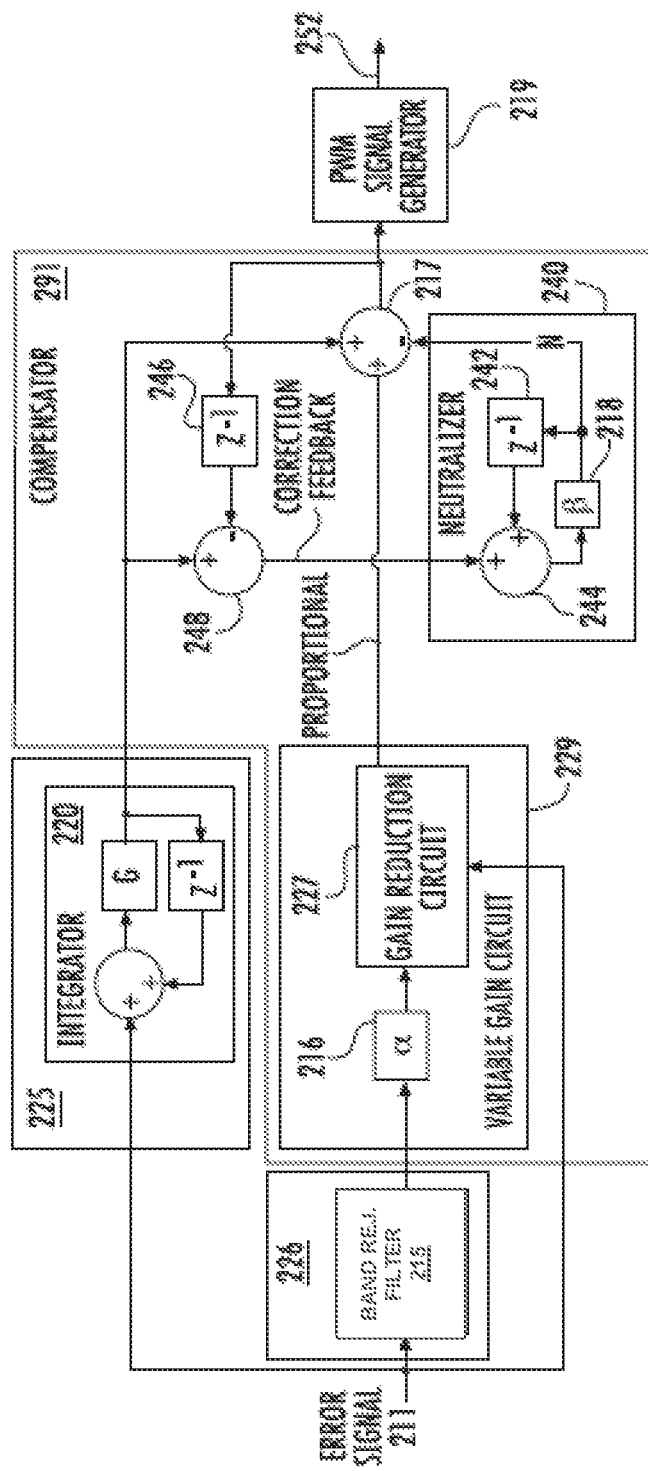
FIG. 2c illustrates an embodiment of a portion of another embodiment of a digital control loop with variable gain.

FIG. 2c illustrates a portion of another embodiment of a digital control loop with variable gain 202, which includes another embodiment of a compensator 291. An AC path 226, a DC path 225, and the gain reduction circuit 227 are configured to receive the error signal 211. The AC path 226 includes a band reject filter 215, e.g. a ripple filter, which filters the error signal 211. The DC path 225 includes an integrator 220. The compensator 291 is configured to receive the error signal 211, the filtered error signal in the AC path 226, and the integrated error signal in the DC path 225.

The compensator 291 further comprises an alpha gain circuit 216 configured to receive the filtered error signal from the band reject filter 215, e.g. the ripple filter. The compensator 291 also includes a gain reduction circuit 227 configured to receive both the output of the alpha gain circuit 216 and the error signal 211. When the error signal 211 exhibits certain characteristics, e.g. enters steady state, then the gain reduction circuit 227 attenuates the amplitude of the signal from the AC path 226, e.g. as amplified by the alpha gain circuit 216. When the amplitude of the signal from the AC path 226 is attenuated, noise, e.g. jitter noise, in the PWM signal 252 is reduced.

The attenuation levels of the gain reduction circuit 227 may be binary, e.g. no attenuation and a fixed level of attenuation, or include additional levels. In one embodiment, the designer or user of the power supply 102 selects the attenuation characteristics. In another embodiment, the designer of the digital control loop with variable gain 202 selects the attenuation characteristics. A digital summer 217 is configured to receive the output of the gain reduction circuit 227, the output of the integrator 220, and the output of a neutralizer 240.

The DC path 225 is coupled to a subtractor 248. The positive input of the subtractor 248 is configured to receive the output of the integrator 220. Also, the negative input of the subtractor 248 is coupled to the output of the delay circuit 246. The delay circuit 246 is configured to receive the output of the compensator 291. Thus, the effect of the subtractor 248 and the delay circuit 246 is to reduce the signal amplitude from the DC path 225 by the amplitude of the last cycle's output of the compensator 291. This reduces the amount of error correction provided by the DC path 225.

The subtractor 248 calculates a correction to the signal from the DC path 225, and which is then neutralized in successive cycles. Such correction does not affect the DC path 225 upon the occurrence of a transient event when the integrator 220 has about a decade lower bandwidth than the AC path 226 so as to not interfere with a time constant of neutralizer 240 determined by the gain of the beta gain circuit 218.

The neutralizer 240, coupled to the DC path 225, is configured to receive the output of the subtractor 248. The neutralizer 240 includes a neutralizer summer 244 configured to receive and add the output of the subtractor 248 and the output of a neutralizer delay circuit 242. A beta gain circuit 218 is configured to receive the output of the neutralizer summer 244. The beta gain circuit 218 amplifies the output of the neutralizer summer 244. The neutralizer delay circuit 242 is configured to receive the output of the beta gain circuit 218. The neutralizer 240 amplifies the amplitude of the signal received from the subtractor 248, by the gain of the beta gain circuit 218. The neutralizer 240 also attenuates the amplitude of the signal received from the subtractor 248 by the amplitude of the last cycle's output of the beta gain circuit 218. Thus, the neutralizer 240 neutralizes the last cycle's correction by the neutralizer 240 in the instant cycle. Beta may range from zero to one. A beta of zero would entirely neutralize the correction of the last cycle, while a beta of one would provide no neutralization. In one embodiment, beta is 0.7 which approximates a critically damped factor.

The digital summer 217 adds the output of the gain reduction circuit 227 and the output of the integrator 220. The digital summer 217 also subtracts the output of the neutralizer 240. As illustrated above, this function may be implemented in numerous ways. A PWM signal generator 219 is configured to receive the output of the digital summer 217, and provide the PWM signal 252.

Figure 2D:
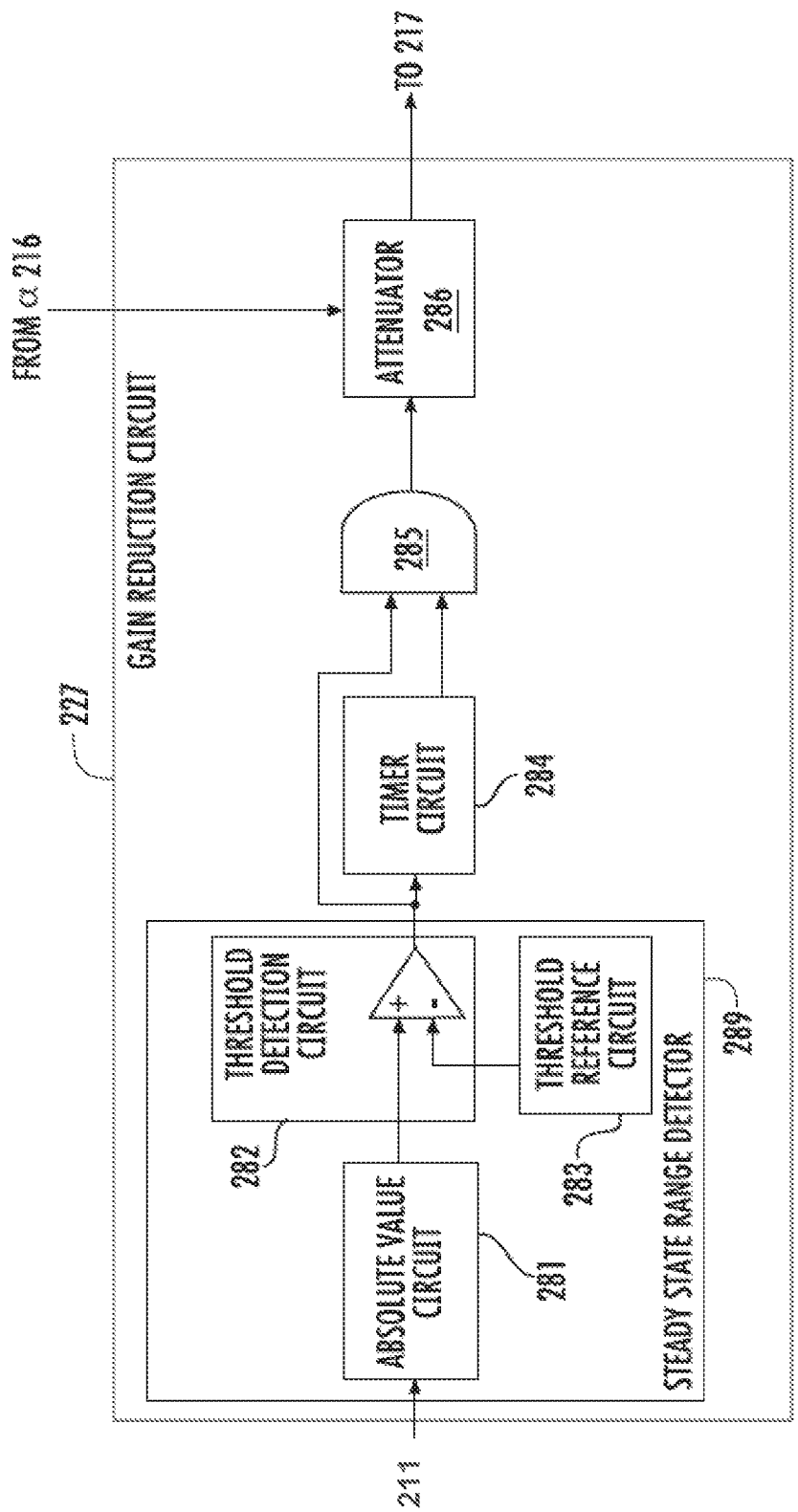
FIG. 2d illustrates an embodiment of a gain reduction circuit.

FIG. 2d illustrates one embodiment of the gain reduction circuit 227. The gain reduction circuit 227 includes a steady state range detector 289, a timer circuit 284, an AND gate 285, and an attenuator 286. The steady state range detector 289 is configured to receive the error signal 211. The steady state range detector 289 determines whether the amplitude of error signal 211 is within upper and lower bounds, e.g. defined by the designer or user of the power supply 102. If the amplitude of the error signal 211 remains within the upper and lower bounds for a fixed time period, then the error signal 211 has entered the steady state. When the amplitude of the error signal 211 no longer remains within such bounds, then the error signal 211 is no longer in steady state.

In one embodiment, the steady state range detector 289 includes an absolute value circuit 281, a threshold detection circuit 282, and a threshold reference circuit 283. In one embodiment, the threshold reference circuit 283 provides a threshold reference voltage. The absolute value circuit 281 is configured to receive the error signal, and calculates the absolute value of the amplitude of the error signal 211. The threshold detection circuit 282 is configured to receive the absolute value of the amplitude of the error signal and the threshold reference circuit 283. In one embodiment, the threshold detection circuit 282 is a comparator. The threshold detection circuit 282 determines if the absolute value of the error signal 211 is lower than the threshold reference circuit 283.

A timer circuit 284 is configured to receive the output of the steady state range detector 289, e.g. the output of the threshold detection circuit 282. An AND gate 285 is configured to receive the output of the steady state range detector 289 and the output of the timer circuit 284. An attenuator 286 is configured to receive the output of the AND gate 285, and the alpha gain circuit 216. Depending upon the value of the error signal 211, the attenuator 286 will attenuate the output of the alpha gain circuit 216. In one embodiment, the attenuator 286 may be implemented by with divider circuit, e.g. a power of 2 divider circuit. In another embodiment, the corresponding gain reduction may range between 2 to 8.

If steady state range detector 289 indicates that the error signal 211 has entered steady state, the timer circuit 284 initiates a timer which runs for a fixed time period. If the error signal 211 remains in steady state during the fixed time period, then at the end of the time period the output of the AND gate 285 changes logic level, e.g. to a high logic level. Upon this change, the attenuator 286 attenuates the signal from the alpha gain circuit 216.

Figure 2E:
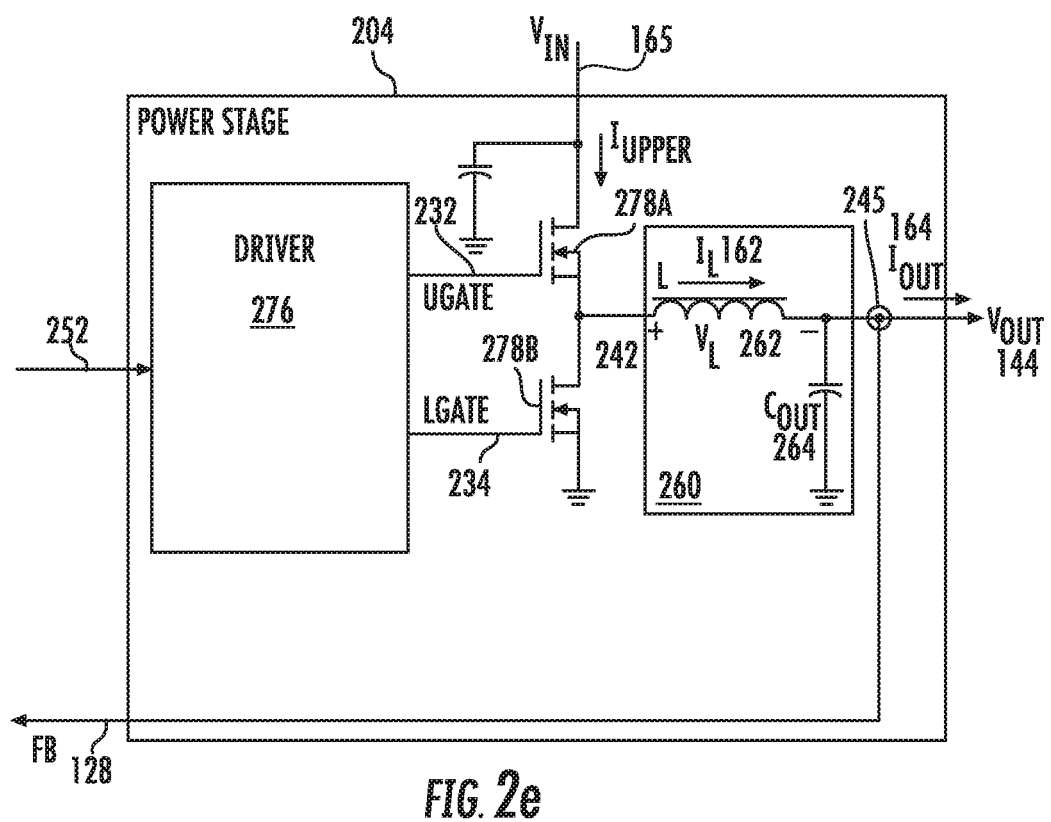
FIG. 2e illustrates a embodiment of a power stage.

FIG. 2e illustrates one embodiment of a power stage 204. The power stage 204 includes a driver 276, power transistors, e.g. upper metal oxide semiconductor field effect transistor (MOSFET') 278A and a lower MOSFET 278B, and an output filter 260. The driver 276 is configured to receive the PWM signal 252 from the digital control loop with variable gain 202. The driver 276 generates a UGate control signal 232 and an LGate control signal 234 that are respectively coupled to inputs of the upper MOSFET 278A and the lower MOSFET 278B. UGate control signal 232 and an LGate control signal 234 respectively cause the upper MOSFET 278A and the lower MOSFET 278B to alternatively switch on and off. In one embodiment, the driver 276 may include dead time control. The output filter 260 may include a series inductor 262 and shunt capacitor 264. The power stage 204 output has a corresponding output voltage 144, VOUT, and output current 164, IOUT.

In one embodiment, a voltage sensor 245 is coupled to the output of the power stage 204. The voltage sensor 245 generates an output voltage sense signal 128, FB, representative of the output voltage 144. The output voltage sense signal 128 may communicate information about the output voltage 144 by varying its voltage or current level.

In one embodiment, the upper MOSFET 278A and the lower MOSFET 278B are powered by the power supply 102. In another embodiment, the power supply 102 provides an input voltage 165, VIN, which is coupled to the drain of the upper MOSFET 278A. In yet a further embodiment, the input voltage 165 is a direct current ('DC') voltage provided by the power supply 102.

In one embodiment, the digital control loop with variable gain 202, driver 276 and at least one power transistor are fabricated on a single integrated circuit ('IC'). Alternatively, the digital control loop with variable gain 202, digital current share control circuit 206 (if required), and driver 276 may be fabricated on a single IC that does not include any power transistors. In another embodiment, the digital control loop with variable gain 202 and the digital current share control circuit 206 (if required) may be fabricated on a single IC; the driver 276 and at least one power transistor may be fabricated on one or more separate ICs. In a further embodiment, the upper MOSFET 278A and the lower MOSFET 278B may be fabricated on a single IC.

Figure 3A:
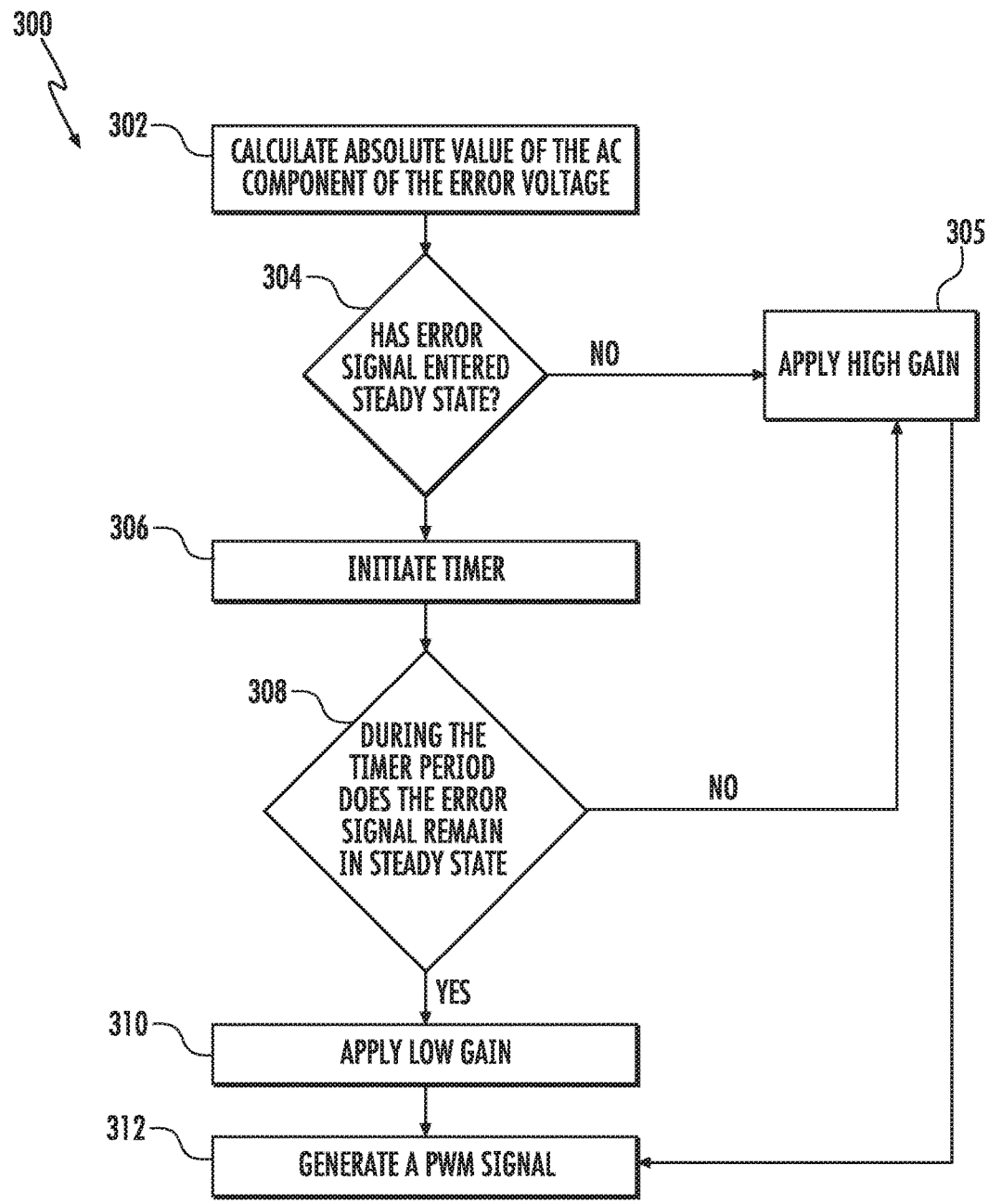
FIG. 3a illustrates one embodiment of operation of a compensator.

One embodiment of a method of operation 300 of a compensator 291 set forth above will now be described, as further illustrated in FIG. 3a. This method pertains to determining when and the corresponding results of the error signal 211 entering steady state. In block 302, calculate the absolute value of the amplitude, e.g. voltage, of the AC component of the error signal 211. In block 304, determine if the error signal 211 has entered steady state. In one embodiment, block 304 comprises determining if the absolute value of the amplitude, e.g. voltage, of the AC component of the error signal 211, e.g. absolute value of the AC component of the error voltage, is within steady state threshold levels. In block 305, if the amplitude of the error signal 211 has not entered steady, then amplify with a high gain the amplitude, e.g. voltage level, of the AC component of the error signal 211 (e.g. amplify with a gain of at least one the voltage of the AC component of the error signal 211). In one embodiment, a 'high gain' is a sufficiently large gain to optimize the digital control loop with variable gain 202 for transient performance (i.e. the bandwidth of the digital control loop with variable gain 202 is sufficiently high to correct overshoot and undershoot specifications while providing enough phase margin to ensure the stability of the digital control loop with variable gain 202 under all operating conditions). In another embodiment, the unity gain cross over frequency of the digital control loop with variable gain 202 would not exceed one quarter of the switching frequency of the PWM signal 252. In yet a further embodiment, the phase margin of the digital control loop with variable gain 202 would be 50 degrees.

In block 306, if the amplitude of the error signal 211 has entered steady state, commence a timer. In block 308, during the fixed time period when the timer runs, determine if the amplitude of the error signal 211 remains in steady state. In block 310, if the amplitude of the error signal 211 is determined to remain in steady state, then apply low gain to (or attenuate) an amplitude, e.g. voltage level, of an AC component of the error signal 211 (e.g. attenuate, i.e. amplify with a gain of less than 1, the voltage level of AC component of the error signal 211). In one embodiment, the low gain is a gain that provides sufficient signal to noise ratio and facilitates a minimum gain of the digital control loop 202 necessary to achieve a required steady state accuracy ('ESS') in the digital control loop with variable gain 202. ESS=1/(1+KLOOP) where KLOOP is the gain of the control loop with variable gain 202. In another embodiment, if the steady state accuracy requirement of the digital control loop with variable gain 202 is 0.5%, then the compensator gain would need to be at least 24.4 dB. Thus, the low gain would need to be a gain or attenuation that would not reduce KLOOP below 24.4 dB.

In block 305, if the amplitude of the error signal 211 is determined not to have remained in steady state, then amplify with a high gain the amplitude of the AC component of the error signal 211. In one embodiment, a high gain is a gain greater than one and significantly greater than the low gain. In another embodiment, a high gain may be the gain when the phase margin of the DC-DC voltage converter is between thirty and sixty degrees; this assumes linear control and an acceptable gain margin. After amplifying with a high or low gain in blocks 305 or 310, then in block 312 generate a PWM signal.

Figure 3B:
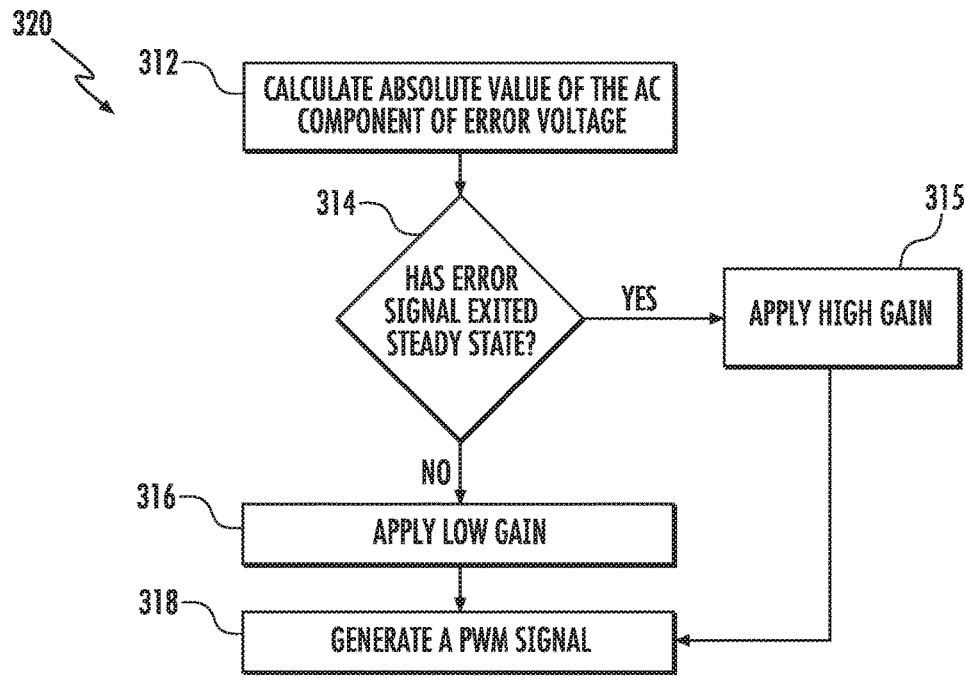
FIG. 3b illustrates another embodiment of operation of compensator.

Another embodiment of a method of operation 320 of a compensator 291 set forth above will now be described, as further illustrated in FIG. 3b. In block 312, calculate the absolute value of the amplitude, e.g. voltage level, of the AC component of the error signal 211. In block 314, determine if the amplitude of the error signal 211 has exited steady state, e.g. absolute value of the AC component of the error voltage, is outside (i.e. not within) steady state threshold levels. In block 315, if the amplitude of the error signal 211 has exited steady state, then amplify with a high gain the amplitude of the error signal 211. In block 316, if the amplitude of the error signal 211 has not exited steady state, then amplify with a low gain (or attenuate) the amplitude of the error signal 211. After applying high or low gain in blocks 315 or 316, then in block 318 generate a PWM signal.

Figure 4:
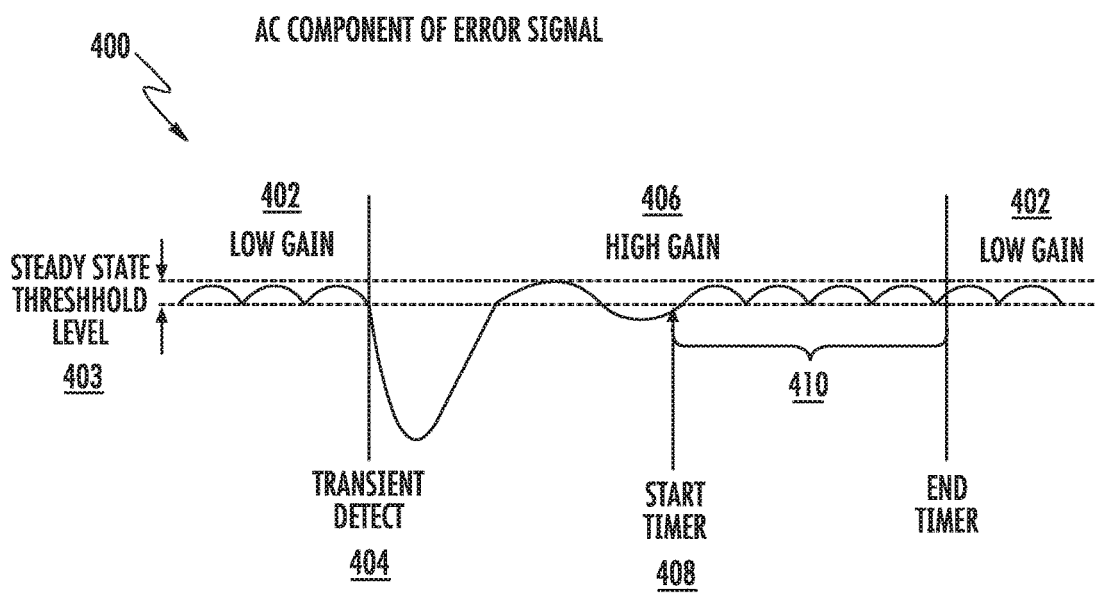
FIG. 4 illustrates an AC component of an error signal.

FIG. 4 illustrates an exemplary AC component 400 of the error signal 211. Initially the amplitude of the AC component 400 is in steady state 402 having an amplitude within a steady state threshold levels 403; thus the variable gain circuit 229 operates in a low gain mode which reduces system noise. However, upon the occurrence of a transient 404, the amplitude of the AC component 400 leaves and is non-steady state 406 and the variable gain circuit 229 operates in a high gain mode. Subsequently, the amplitude of the AC component 400 returns to within the steady state threshold levels 403, and a timer 408 begins running. If the amplitude of the AC component 400 of the error signal 211 remains within in the steady state threshold levels 403 for a period of time 410, the AC component 400 is once again in steady state 402. Thus, the variable gain circuit 229 decreases its gain and operates again in low gain mode.

Although only a DC-DC buck converter, the invention may be implemented in other DC-DC converter topologies, including without limitation boost converters and buck-boost converters.

EXAMPLE EMBODIMENTS

Example 1 includes an apparatus, comprising: an error amplifier having a positive input coupled to a reference voltage, and a negative input coupled to an output voltage sense signal; wherein an output of the error amplifier is coupled to an input of an AC path, an input of a DC path and an input of a gain reduction circuit; the gain reduction circuit having an input coupled to an output of the AC path; a beta gain circuit having an input coupled to an output of a summer;

the summer having inputs coupled to an output of the gain reduction circuit, an output of the DC path, and an output of the beta gain circuit; and wherein the output of the summer is the sum of the signals at the inputs of the summer coupled to the outputs of the gain reduction circuit and the DC path, less the signal at the input of the summer coupled to the output of the beta gain circuit.

Example 2 includes the apparatus of Example 1, wherein the gain reduction circuit comprises an alpha gain circuit coupled to a variable gain circuit.

Example 3 includes the apparatus of Example 1 further comprising a PWM signal generator configured to receive the output of the summer, and having an output configured to provide a PWM signal.

Example 4 includes the apparatus of Example 3, further comprising a power stage having an input coupled to the output of the PWM signal generator, and which provides the output voltage sense signal.

Example 5 includes the apparatus of Example 1, wherein the DC path comprises an integrator.

Example 6 includes the apparatus of Example 1, wherein the AC path comprises a band reject filter.

Example 7 includes the apparatus of Example 6, wherein the band reject filter is a ripple filter.

Example 8 includes the apparatus of Example 1 wherein the gain reduction circuit comprises: an alpha gain circuit; and a variable gain circuit coupled to the alpha gain circuit.

Example 9 includes the apparatus of Example 8 wherein the variable gain circuit comprises: a steady state range detector; a timer circuit having an input coupled to an output of the steady state range detector; an AND gate having inputs respectively coupled to the outputs of the steady state range detector and the timer circuit; and an attenuator having inputs respectively coupled to the outputs of the AND gate and the alpha gain circuit.

Example 10 includes the apparatus of Example 9, wherein the steady state range detector comprises: an absolute value circuit; a threshold reference circuit; and a threshold detection circuit having inputs respectively coupled to the outputs of the absolute value circuit and the threshold reference circuit.

Example 11 includes the apparatus of Example 1 further comprising: a first delay circuit coupled to the output of the summer; a subtractor having inputs coupled to an output of the DC path and an output of the delay circuit; wherein the output of the subtractor is the signal at the output of the delay circuit less the signal at the output of the DC path; a second summer having inputs coupled to the outputs of the subtractor and a second delay circuit; wherein an output of the second summer is coupled to the input of the beta gain circuit; and wherein the output of the beta gain circuit is coupled to the input of the second delay circuit.

Example 12 includes a system comprising: a control loop comprising: an error amplifier having a positive input coupled to a reference voltage, and a negative input coupled to an output voltage sense signal; wherein an output of the error amplifier is coupled to an input of an AC path, an input of a DC path and an input of a compensator; the compensator comprising: a gain reduction circuit having inputs coupled to an output of the AC path, and the output of the error amplifier; a beta gain circuit having an input coupled to an output of a summer; a summer having inputs coupled to an output of the gain reduction circuit, an output of the DC path, and an output of the beta gain circuit; and wherein the output of the summer is the sum of the signals at the inputs of the summer coupled to the outputs of the gain reduction circuit and the DC path, less the signal at the input of the summer coupled to the output of the beta gain circuit; a PWM signal generator configured to receive the output of the summer, and having an output configured to provide a PWM signal; and a power stage having an input coupled to an output of the PWM signal generator, and configured to generate the output voltage sense signal.

Example 13 includes the system of Example 12, further comprising a load coupled to an output of the power stage.

Example 14 includes the system of Example 13, wherein the load comprises a processor coupled to a memory.

Example 15 includes the system of Example 12, wherein the gain reduction circuit comprises an alpha gain circuit coupled to a variable gain circuit.

Example 16 includes the system of Example 12, wherein the DC path comprises an integrator.

Example 17 includes the system of claim Example 12, wherein the AC path comprises a band reject filter.

Example 18 includes the system of Example 17, wherein the band reject filter is a ripple filter.

Example 19. includes a method, comprising: determining if an amplitude of an error signal has entered steady state; if the amplitude of the error signal has not entered steady state, then amplify with a high gain the amplitude of the AC component of the error signal; if the amplitude of the error signal has entered steady state, then initiate a timer; determining if the amplitude of the error signal has remained in steady state while the timer runs; and if the amplitude of the error signal has remained in steady state while the timer runs, then amplify with a low gain the amplitude of the AC component of the error signal.

Example 20 includes the method of Example 19, further comprising calculating an absolute value of an amplitude of an AC component of the error signal; and wherein determining if an error signal has entered steady state further comprises determining if the absolute value of the amplitude of the AC component of the error signal is within one or more steady state threshold levels.

Example 21 includes the method of Example 20, further comprising generating a PWM signal.

Example 22 includes the method of Example 19, further comprising: determining if the amplitude of the error signal has exited steady state; if the error signal has not exited steady state, then amplify with the low gain the amplitude of the AC component of the error signal; and if the amplitude of the error signal has exited steady state, then amplify with the high gain the amplitude of the AC component of the error signal.

Example 23 includes the method of claim 22, further comprising calculating an absolute value of the amplitude of an AC component of the error signal; and wherein determining if the amplitude of the error signal has exited steady state further comprises determining if the absolute value of the amplitude of the AC component of the error signal is outside of one or more steady state threshold levels.

It will be evident to one of ordinary skill in the art that the processes and resulting apparatus previously described can be modified to form various apparatuses having different circuit implementations and methods of operation. Notwithstanding that the numerical ranges and parameters setting forth the broad scope of the present teachings are approximations, the numerical values set forth in the specific examples are reported as precisely as possible. Signal levels and generators herein are exemplified with reference to voltage or current. However, those skilled in the art understand that a voltage signal or a voltage generator can respectively be implemented with current signals and current generators, or vice versa. Therefore, such signals may also be referred herein as signals or thresholds rather than voltages and current. Correspondingly, voltage and current generators may be referred to as generators.

Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the methods and structures disclosed herein. It is intended that the specification and examples be considered as exemplary only, with a true scope and spirit of the present teachings being indicated by the following claims.

What is claimed is:

1. An apparatus, comprising:
    a filter that filters a signal representing an error voltage, wherein the error voltage is associated with an output voltage of a DC-DC voltage converter; and
    a compensator having an amplifier gain that depends on an amplitude of the error voltage, the compensator using the filtered signal to produce an output that controls one or more phases of the DC-DC voltage converter.

2. The apparatus of claim 1, wherein the filter comprises a band reject filter.

3. The apparatus of claim 2, wherein the band reject filter is a ripple filter.

4. The apparatus of claim 2, wherein the band reject filter is configured to remove a peak-to-peak signal component associated with the output voltage.

5. The apparatus of claim 2, wherein the band reject filter is configured to remove harmonics of a switching frequency of the DC-DC voltage converter.

6. The apparatus of claim 1, wherein the compensator includes a variable gain circuit that forms the amplifier gain that depends on the amplitude of the error voltage, wherein the amplifier gain is applied to the filtered signal for use in producing the output.

7. The apparatus of claim 6, wherein the variable gain circuit includes:
    a steady state range detector that determines when the error voltage is in a steady state range and produces a logic signal based on the comparison; and
    a gain adjuster that adjusts the amplifier gain in response to the logic signal.

8. The apparatus of claim 7, wherein the steady state range detector comprises:
    an absolute value circuit that determines an absolute value of the error voltage;
    a threshold detection circuit that compares the absolute value with a threshold and produces the logic signal based on the comparison.

9. The apparatus of claim 7, further comprising:
    a timer circuit having an input coupled to an output of the steady state range detector, wherein the timer circuit delays receipt of the logic signal by the gain adjuster by a predetermined amount of time.

10. The apparatus of claim 1, further comprising an integrator for producing an integration on a lowpass filtered version of the error voltage, wherein the integration is further used by the compensator to produce the output.

11. A method, comprising:
    filtering a signal representing an error voltage, wherein the error voltage is associated with an output voltage of a DC-DC voltage converter;
    adjusting an amplifier gain of a compensator depending on an amplitude of the error voltage;
    using, by the compensator, the filtered signal to produce an output that controls one or more phases of the DC-DC voltage converter.

12. The method of claim 11, wherein filter comprises performing a band reject filtering on the signal.

13. The method of claim 12, wherein the band reject filtering comprises a ripple filter.

14. The method of claim 12, wherein the band reject filtering includes removing a peak-to-peak signal component associated with the output voltage.

15. The method of claim 12, wherein the band reject filtering includes removing harmonics of a switching frequency of the DC-DC voltage converter.

16. The method of claim 11, further comprising:
    forming the amplifier gain depending on the amplitude of the error voltage; and
    applying the amplifier gain to the filtered signal for use in producing the output.

17. The method of claim 16, wherein forming the amplifier gain includes:
    determining when the error voltage is in a steady state range; and
    adjusting the amplifier gain in response to a determination that the error voltage is in the steady state range.

18. The method of claim 17, wherein determining when the error voltage is in the steady state range comprises:
   determining an absolute value of the error voltage;
   comparing the absolute value with a threshold; and
   providing an indication that the error voltage is in the steady state range based on the comparison.

19. The method of claim 17, further comprising:
   delaying receipt of the determination that the error voltage is in the steady state range by a predetermined amount of time before adjusting the amplifier gain.

20. The method of claim 11, further comprising:
   producing an integration on a lowpass filtered version of the error voltage, wherein using further includes using the integration to produce the output.

* * * * *